(12) United States Patent
Stanton

(10) Patent No.: US 12,212,125 B2
(45) Date of Patent: Jan. 28, 2025

(54) STUB-UP PROVIDING COMBINATION WIREWAY AND ELECTRICAL BOX

(71) Applicant: Martin J. Stanton, Glenside, PA (US)

(72) Inventor: Martin J. Stanton, Glenside, PA (US)

( * ) Notice: Subject to any disclaimer, the term of this patent is extended or adjusted under 35 U.S.C. 154(b) by 186 days.

(21) Appl. No.: 17/731,380

(22) Filed: Apr. 28, 2022

(65) Prior Publication Data

US 2023/0155359 A1     May 18, 2023

Related U.S. Application Data

(60) Provisional application No. 63/279,827, filed on Nov. 16, 2021.

(51) Int. Cl.
| | |
|---|---|
| *H02G 1/08* | (2006.01) |
| *E04B 2/02* | (2006.01) |
| *E04B 2/56* | (2006.01) |
| *E04B 5/48* | (2006.01) |
| *H02G 3/08* | (2006.01) |
| *H02G 3/38* | (2006.01) |

(52) U.S. Cl.
CPC ............. *H02G 1/081* (2013.01); *H02G 3/083* (2013.01); *H02G 3/283* (2013.01); *E04B 2/02* (2013.01); *E04B 2/56* (2013.01); *E04B 5/48* (2013.01)

(58) Field of Classification Search
CPC .......... H02G 1/08; H02G 1/081; H02G 3/083; H02G 3/283; H02G 3/26; H02G 3/08; H02G 3/0425; H02G 3/0431; H02G 3/0432; H02G 3/0493; H02G 3/086; H02G 3/10; H02G 3/12; H02G 3/123; H02G 3/128; H02G 1/50; H02G 1/305; H02G 3/125; Y10S 248/906; E04B 2/02; E04B 2/56; E04B 5/48
See application file for complete search history.

(56) References Cited

U.S. PATENT DOCUMENTS

| | | | | |
|---|---|---|---|---|
| 3,047,650 | A * | 7/1962 | Reiland | H02G 3/185 |
| | | | | 220/3.7 |
| 4,785,376 | A * | 11/1988 | Dively | H02B 1/50 |
| | | | | 137/356 |
| 4,790,505 | A * | 12/1988 | Rose | H02G 3/125 |
| | | | | 248/300 |
| 4,862,660 | A * | 9/1989 | Raymond | F24F 13/20 |
| | | | | 52/404.3 |
| 4,892,978 | A * | 1/1990 | Axworthy | H02G 9/10 |
| | | | | 174/38 |
| 5,366,190 | A * | 11/1994 | Schaefer | H02G 3/0493 |
| | | | | 52/28 |

(Continued)

FOREIGN PATENT DOCUMENTS

EP        1513238 A1 *    3/2005      ........... H02G 3/0493

*Primary Examiner* — Theodore V Adamos
(74) *Attorney, Agent, or Firm* — Howson & Howson LLP

(57) ABSTRACT

A stub-up is provided for being anchored to concrete slab flooring in which conduit is embedded and through which electrical wiring may be extended. The stub-up comprises a one-piece hollow body having an upper end providing an electrical box and a lower end providing a base permitting the hollow body to be anchored to an underlying concrete slab in an upstanding position. The hollow body provides a wireway for electrical wiring from the slab to the electrical box. Wall structures and methods are also disclosed.

12 Claims, 11 Drawing Sheets

(56) References Cited

U.S. PATENT DOCUMENTS

| | | | | |
|---|---|---|---|---|
| 5,675,949 | A * | 10/1997 | Forslund | H02G 3/285 |
| | | | | 52/239 |
| 6,017,228 | A * | 1/2000 | Verbeek | H02G 3/0493 |
| | | | | 439/142 |
| 6,321,928 | B1 * | 11/2001 | Goldenstein | E02D 27/42 |
| | | | | 220/484 |
| 6,430,882 | B1 * | 8/2002 | Feldpausch | H02G 3/28 |
| | | | | 52/220.1 |
| 6,795,300 | B1 * | 9/2004 | Holley | H02B 1/50 |
| | | | | 174/45 R |
| 10,158,221 | B2 * | 12/2018 | Seff | H02B 1/50 |
| 10,333,284 | B2 * | 6/2019 | Schneider | H01R 13/5221 |
| 10,483,726 | B1 * | 11/2019 | Seff | H02B 1/26 |
| 10,910,802 | B2 * | 2/2021 | Huffstetler | H02G 3/0493 |
| 2004/0007378 | A1 * | 1/2004 | Vrame | H02G 3/123 |
| | | | | 174/58 |
| 2004/0093813 | A1 * | 5/2004 | Sigrist | E04D 13/1407 |
| | | | | 52/219 |
| 2005/0067546 | A1 * | 3/2005 | Dinh | H02G 3/125 |
| | | | | 220/3.9 |
| 2007/0044985 | A1 * | 3/2007 | Tideback | H02G 3/08 |
| | | | | 174/50 |
| 2008/0251650 | A1 * | 10/2008 | Borbolla | H02G 3/086 |
| | | | | 174/58 |
| 2008/0253061 | A1 * | 10/2008 | Seff | H02B 1/50 |
| | | | | 361/622 |
| 2009/0152001 | A1 * | 6/2009 | Michlovic | H02G 3/0493 |
| | | | | 174/495 |
| 2011/0197794 | A1 * | 8/2011 | Nunes | H02G 11/02 |
| | | | | 174/59 |
| 2014/0127948 | A1 * | 5/2014 | Beldock | H01R 25/006 |
| | | | | 439/652 |
| 2017/0054277 | A1 * | 2/2017 | Unger | H02B 1/28 |
| 2017/0211739 | A1 * | 7/2017 | Vrame | F16L 41/002 |
| 2022/0412115 | A1 * | 12/2022 | White | E04H 12/182 |

\* cited by examiner

STUB-UP PROVIDING COMBINATION WIREWAY AND ELECTRICAL BOX

CROSS REFERENCE TO RELATED APPLICATIONS

This application claims the benefit under 35 USC § 119(e) of U.S. Provisional Patent Application No. 63/279,827, filed Nov. 16, 2021.

BACKGROUND

The present invention generally relates to the electrical field and the trade term "stubbing up" as known by electrical contractors.

It is conventional practice to install electrical conduit raceways within a body of a concrete slab, for instance, forming a floor within a building. The raceways typically terminate near the top of the slab to enable the in-slab conduit to be coupled to additional conduit providing a further extension of the raceway. The section of the conduit extending above the slab elevation is commonly referred to as a "conduit stub-up".

Accordingly, "stubbing up" is a process of installing pipe or conduit connected to and extending from embedded conduit within a concrete slab so as to extend the raceway to a desired location, such as a separately installed electrical box within a wall, such as a masonry or studded wall. This typically involves the use of one or more pieces of conduit needing to be bent, cut, and installed in a relatively laborious process.

SUMMARY

A stub-up for being anchored to concrete slab flooring in which conduit is embedded and through which electrical wiring may be extended, is provided in the form of a one-piece hollow body having an upper end providing an electrical box and a lower end providing a base permitting the hollow body to be anchored to and supported in an upstanding position on am underlying concrete slab. The hollow body provides a wireway for electrical wiring from the slab to the electrical box.

According to another aspect of the present invention, a building structure is provided. The building structure includes a concrete slab floor in which a conduit is embedded for the passage of electrical wiring therethrough. The in-slab conduit has a bell end adjacent an upper surface of the concrete slab floor. The building structure includes a wall formed on the concrete slab floor such that the bell end of the in-slab conduit is located within the wall. A stub-up is anchored to the concrete slab floor within the wall over the bell end of the in-slab conduit. The stub-up is provided in the form of a one-piece hollow body having an upper end providing an integral electrical box and a lower end providing a base anchored to the upper surface of the concrete slab floor such that the stub-up is in an upstanding position with the wall. The hollow body provides a wireway for electrical wiring from the bell end of the in-slab conduit to the electrical box of the stub-up.

According to another aspect of the present invention, a method of installing a conduit stub-up is provided. A one-piece hollow body having an upper end providing an electrical box and a lower end providing a base is used to provide a wireway for electrical wiring from an underlying concrete slab to the electrical box. The hollow body is positioned on and anchored to a surface of a concrete slab over an exposed bell end of conduit embedded in the concrete slab for the passage of electrical wiring therethrough to the electrical box.

DETAILED DESCRIPTION

Figure 1:
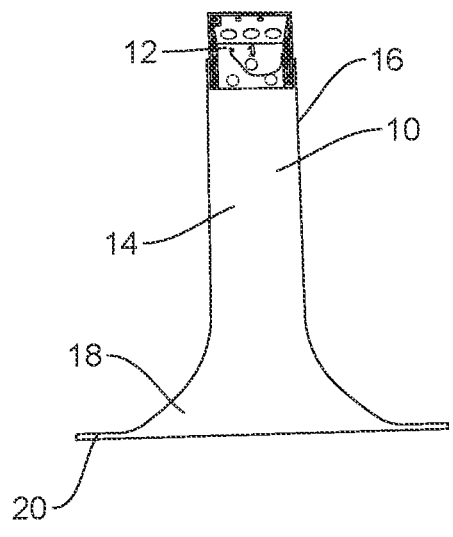
FIG. 1 is a front elevational view of a pre-made stub-up including a raceway and integral electrical box in accordance with an embodiment.
Figure 2:
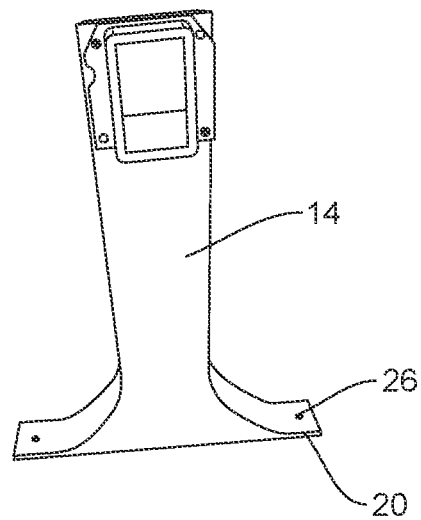
FIG. 2 is a perspective view as viewed from a front of the pre-made stub-up of FIG. 1 with a tile ring attached to the front of the electrical box.

According to an embodiment, a pre-made, one-piece stub up is provided with an integral electrical box and wireway combination all in one. For example, as shown in FIG. 1, the stub-up 10 includes an electrical box 12 integrally formed or secured at an upper end 16 of a wireway 14. The stub-up includes a lower end 18 that is adapted to be secured to a concrete slab such that the stub-up 10, as installed, is secured in an upstanding position. In this manner, the electrical box 12 may be located at a desired height above finished floor (AFF).

According to an embodiment, the lower end 18 of the wireway 14 is wider than the upper end 16 (i.e., the upper end 16 may have the same width as the electrical box 12, whereas the lower end 18 may have a wider footprint than that of the upper end 16 and electrical box 12). The lower end 18 forms a base of the wireway 14 which is to be secured to a concrete slab. Thus, the base may have oppositely extending flanges or wings 20 or the like that extend laterally outward to a greater extent than the upper end 16 of the wireway 14. Each of the flanges 20 may include a mounting hole 26 which allows the use of anchors to secure the base to the concrete slab. In addition, the relatively larger base allows the positioning of the stub-up 10 to be adjusted to the tight or the left of the location where the in-slab conduit is located on the slab. The adjustment of position of the stub-up within the wall permits the electrical box 12 to be at a desired location within a wall, even if the desired location is not directly above the in-slab conduit.

Figure 3:
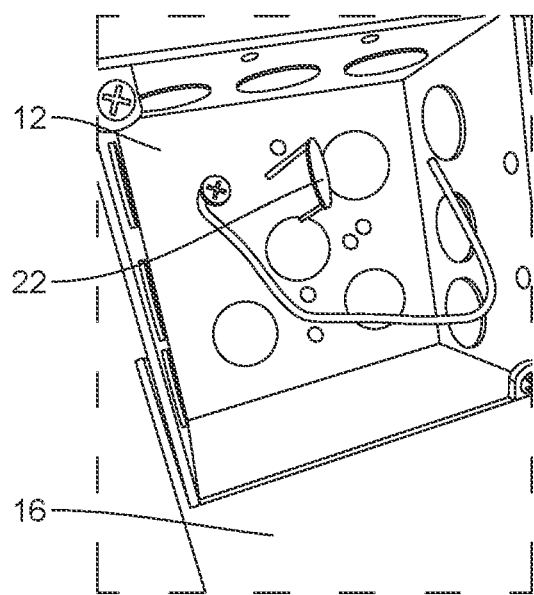
FIG. 3 is view of the electrical box of the pre-made stub-up of FIG. 1.
Figure 4:
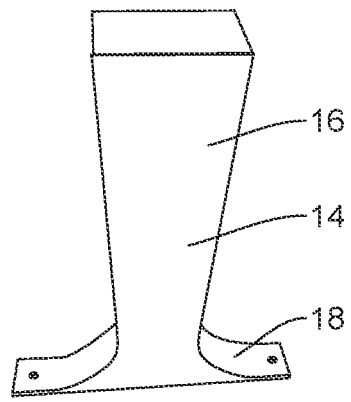
FIG. 4 is a perspective view as viewed from a rear of the pre-made stub-up of FIG. 1.
Figure 5:
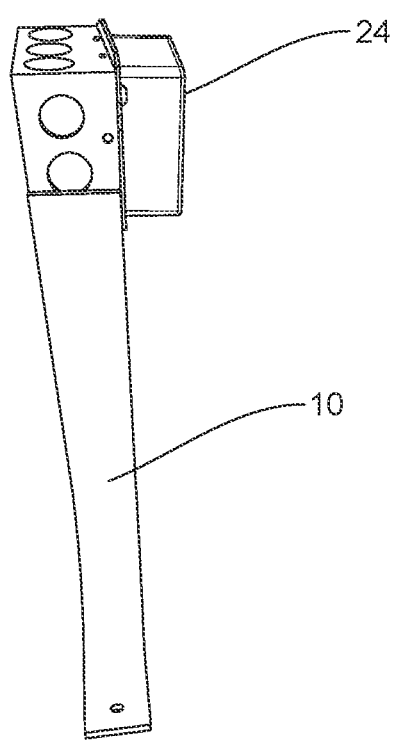
FIG. 5 is a perspective view as viewed from a side of the pre-made stub-up of FIG. 1 with a tile ring attached to the front of the electrical box.

According to an embodiment, the electrical box 12 may include a string ring 22 or hook or the like to which string may be attached. For instance, see FIG. 3. The string is used during installation of the floor and wall so that electrical wire may ultimately be pulled through the raceway to the electrical box 12.

In addition, a separate tile ring 24 of a desired size/depth can be secured to the front of the electrical box 12 so that the front edge of the tile ring lies flush with the exterior surface of the wall in which the electrical box 12 is positioned.

Use of the stub-up 10 enables a reduction of man hours required by an electrical contractor when stubbing up from a concrete floor to a location of an electrical box within a wall. For example, the conventional painstaking process requires conduit to be bent and cut so that it extends at a desired place within a wall and this activity is eliminated and replaced with a process of installing the stub up 10 which is provided as a pre-made, one-piece electrical box and wireway combination.

The electrical box 12 may be provided in the form of a standard so-called 1900 box or the like and may be designed for use with tile rings of different sizes. The electrical box 12 may be welded to the wireway 14 or made integral therewith. The upper end 16 of the wireway 14 may be of trade standard dimensions, and the lower end 18 of the wireway may include a pair of mounting holes 26 on oppositely extending flanges or wings 20 for use in fastening the stub-up 10 to concrete slab flooring. The stub-up 10 is self-standing and can be securely anchored to an underlying concrete slab. After the stub-up 10 is anchored, no further support of the stub-up relative to the wall, studs, etc. is required.

The stub-up 10 may be pre-made at a standard height. For instance, the stub-up 10 may be sized to locate the electrical box 18 inches AFF. For non-standard heights, the stub-up 10 may be produced of different sizes or may include couplings and/or trough sections for extending the height. Alternatively, the wireway 14 of the stub-up may be expandable or collapsible enabling ready field adjustment when needed for non-standard box elevations.

By way of example, and not by way of limitation, the stub up 10 may be provided to provide electrical box elevations of 18", 24", 40", 42", or 48", to the center of box AFF. If demand for other heights is needed, the stub up 10 may be provided in other heights. Couplings and or trough pieces may be provided for electrical box heights that are out of the ordinary.

The stub-up 10 is designed such that it may be placed over the exposed bell end of embedded conduit (i.e., the bell end of the conduit may be flush with concrete slab or close to being flush with the slab). In addition, the design of the lower end 18 or base of the stub-up 10 enables the position of the stub-up 10 to be adjusted left or right within the wall to a desired lateral location. By way of example, the stub-up 10 may be designed so that it can be position at least 5 inches in in either direction (right or left within the wall) relative to the position of the exposed bell end of the embedded conduit due to its expanded-size lower end 18. In this manner, obstacles, such as studs or the like, may be readily avoided and desired positioning of the electrical box 12 may be readily provided.

During installation, it is not only highly recommended but very much a necessity to have strings extending through all conduits, raceways, wireways, etc. prior to installation of the stub up 10. Thus, before placing the stub up 10 at a desired location, strings or the like are fished from the in-slab conduit to and through the wireway 14 and into the electrical box 12. The strings are then tied to the hook or string ring 22 extending within the electrical box 12. After the strings are tied to the hook or string ring 22, the stub-up 10 is positioned at a desired location with lateral adjustment permitted as discussed above and fastened to the concrete slab with any type of masonry anchor extended through the provided holes 26 on the mounting flanges 20 of the stub-up 10.

For final adjustment of the electrical box to the face of a wall, the electrician may attach a desired size of tile ring 24 to the front of the electrical box 12 of the stub-up 10. The stub-up 10 may include a variety of knockouts on the back, sides, or top of the electrical box 12 so that additional above ground conduit work may be connected thereto, as needed for a particular project.

For purposes of providing examples of the use of the stub-up 10 within a wall of a building, two examples showing an installation process are provided with reference to FIGS. 6-16 (studded wall construction) and FIGS. 17-20 (masonry wall construction).

Figure 6:
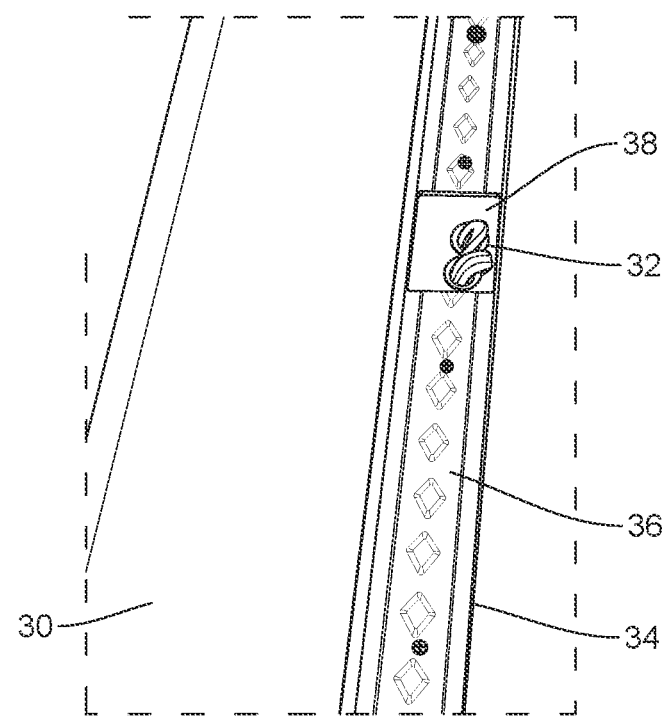
FIG. 6 is a perspective view of a base track for a wall installed on a concrete slab with a part of the base track cut-away to expose an end of the in-slab electrical raceway.

A concrete slab 30 is shown in FIG. 6. Raceway conduit through which electrical wire may be extended is embedded with the slab 30. Bell ends 32 of two such conduits extend through top surface of the slab 30. A carpenter or the like may snap a wall line 34 which extends adjacent the bell ends 32 so that electrical wire may be extended into and within a wall to be constructed.

Figure 7:
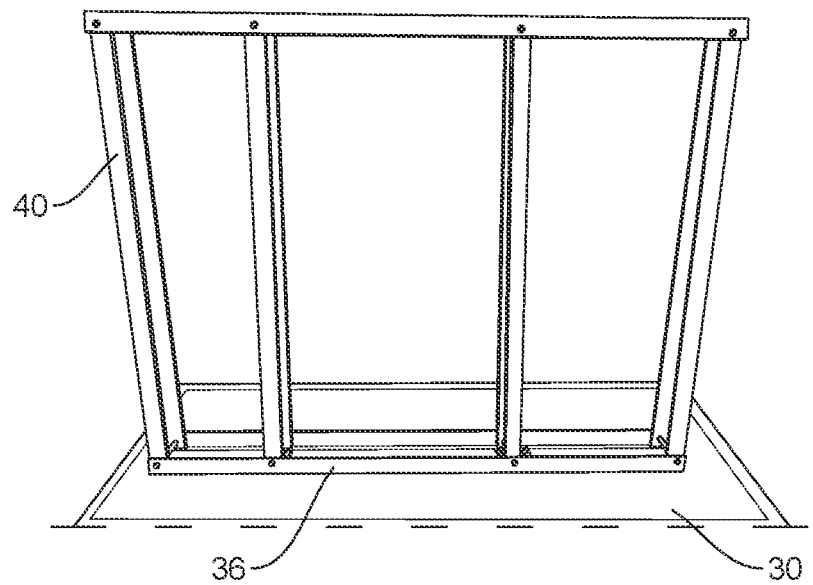
FIG. 7 is a front perspective view of wall studs as installed on the concrete slab.
Figure 8:
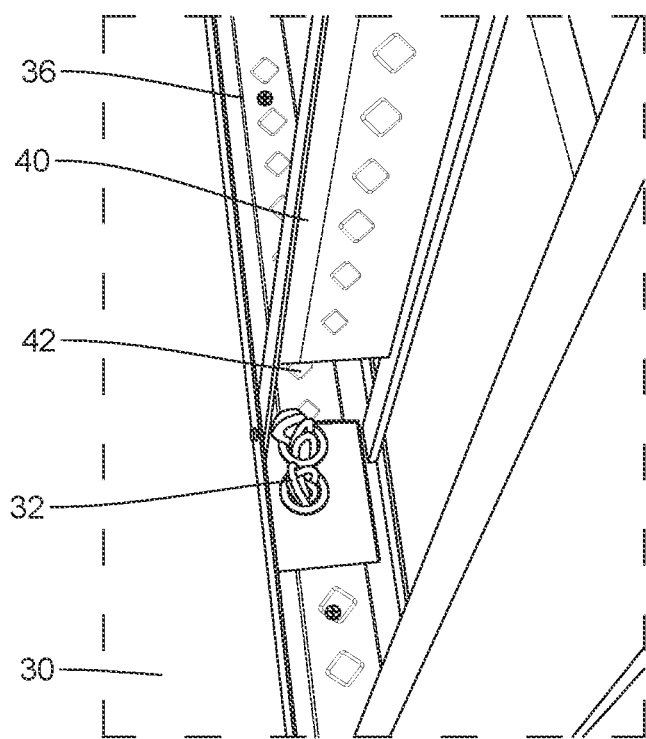
FIG. 8 is a perspective view of the wall studs of FIG. 7 at a location where cuts have been made to the studs so that the end of the in-slab electrical raceway remains exposed.

A base track 36 of a studded wall is secured to the slab 30 along the wall line 34. The base track 36 includes a section 38 that is cut-away to expose the bell ends 32 of the embedded conduit. See FIG. 6. Studs 40 are then secured to the base track 36 as shown in FIG. 7. As best shown in FIG. 8, since the bell ends 32 of the embedded conduit are near one of the studs 40, this may require the carpenter to cut away a portion 42 of the studs that may directly land on the bell ends 32.

Figure 9:
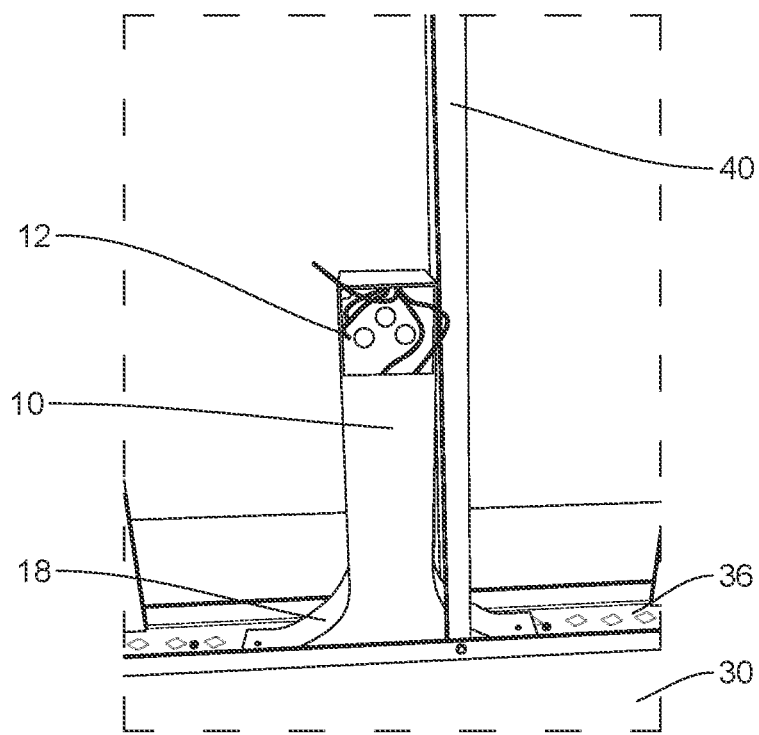
FIGS. 9-12 are perspective views of the wall studs of FIG. 7 in which the stub-up of FIG. 1 is installed in accordance to an embodiment.
Figure 10:
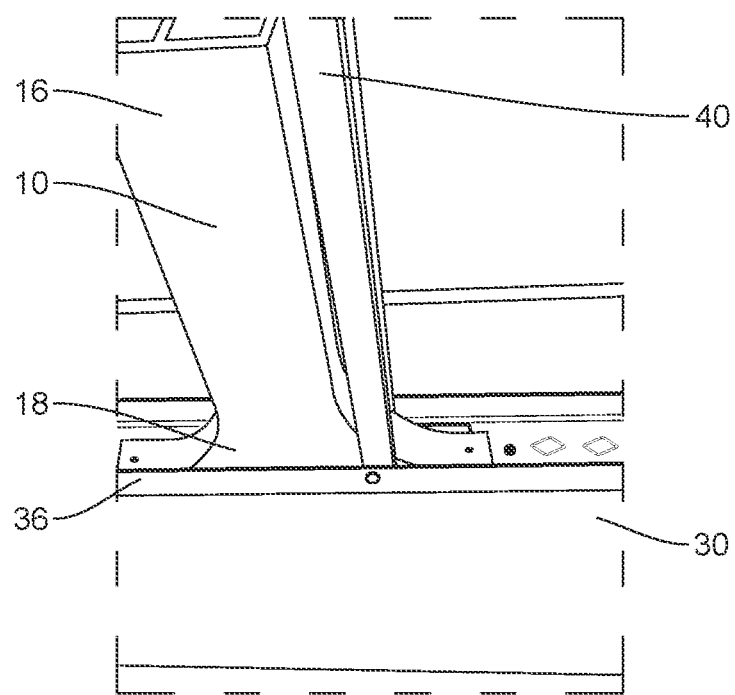
Figure 11:
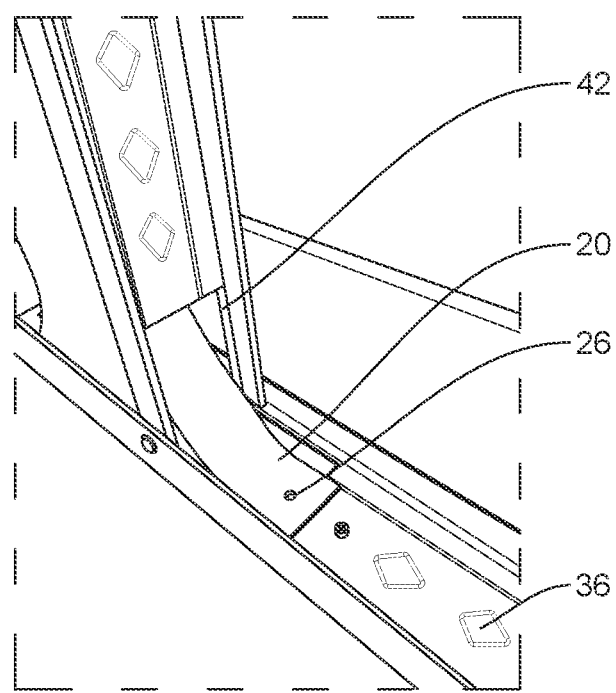
Figure 12:
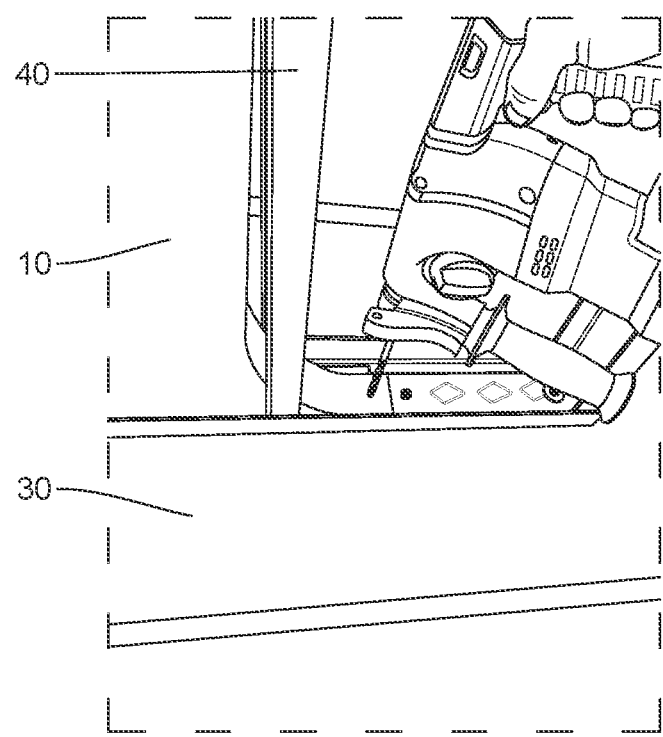

As best shown in FIG. 9, a stub-up 10 may be positioned over the bell ends 32. As shown in FIG. 10, the laterally extending flanges 20 of the lower end 18 of the wireway 14 of the stub-up 10 can extend through the cut away portion 42 of the stud so that the bell ends 32 are located underneath the stub-up 10 and so that the electrical box 12 is positioned latterly of the studs 40 and does not interfere with the studs 40. See FIGS. 10 and 11. The stub-up 10 may be positioned on either side of the stud 40 to the right or the left as desired.

The electrician or the like fishes the strings extended to the bell ends 32 of the embedded conduit through the open lower end 18 of the hollow wireway 14 of the stub-up 10 to the electrical box 12. There, the strings are tied off to the string ring 22 located within the electrical box 12. See FIG. 9. Thereafter, the location of the stub-up 10 may be adjusted and anchors may be applied to the lower end 18 of the stub-up 10 to secure the stub-up 10 to the concrete slab 30. See FIG. 12.

Figure 13:
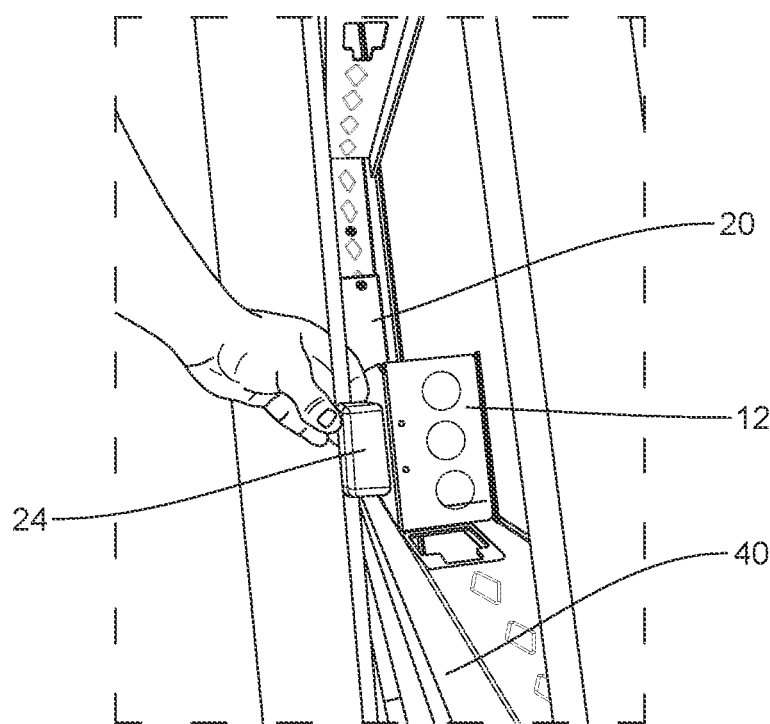
FIG. 13 is a perspective views of a tile ring being installed on the electrical box of the sub-up of FIG. 1 with the wall studs of FIG. 7 in accordance to an embodiment.
Figure 14:
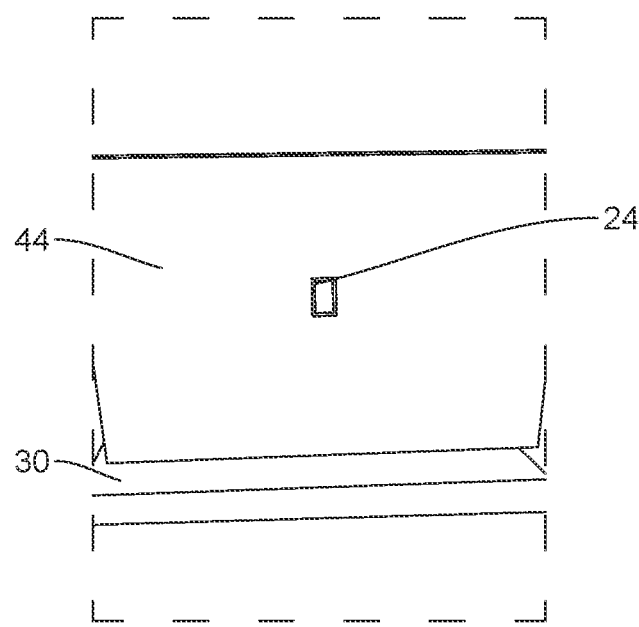
FIGS. 14 and 15 are front views of the wall of FIG. 7 on which sheathing has been installed and through which electrical wire has been pulled in accordance to an embodiment.
Figure 15:
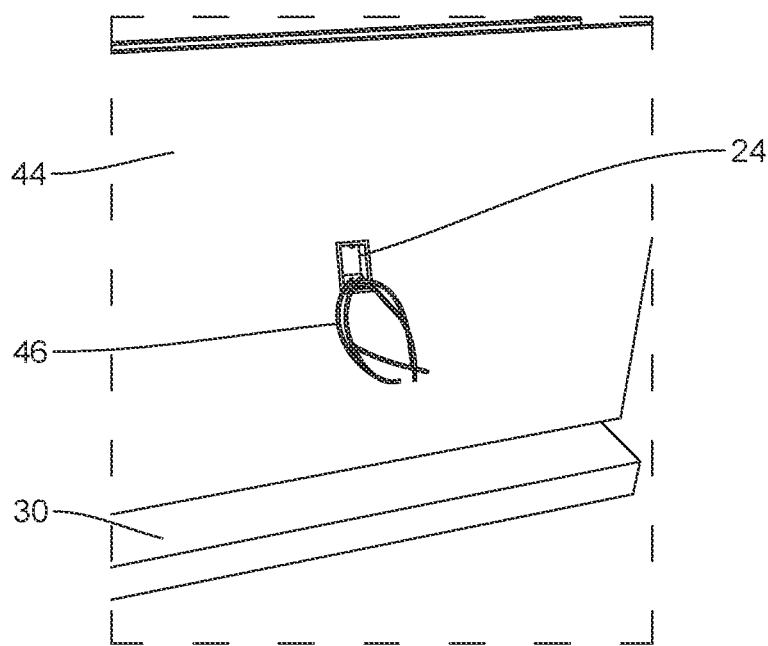
Figure 16:
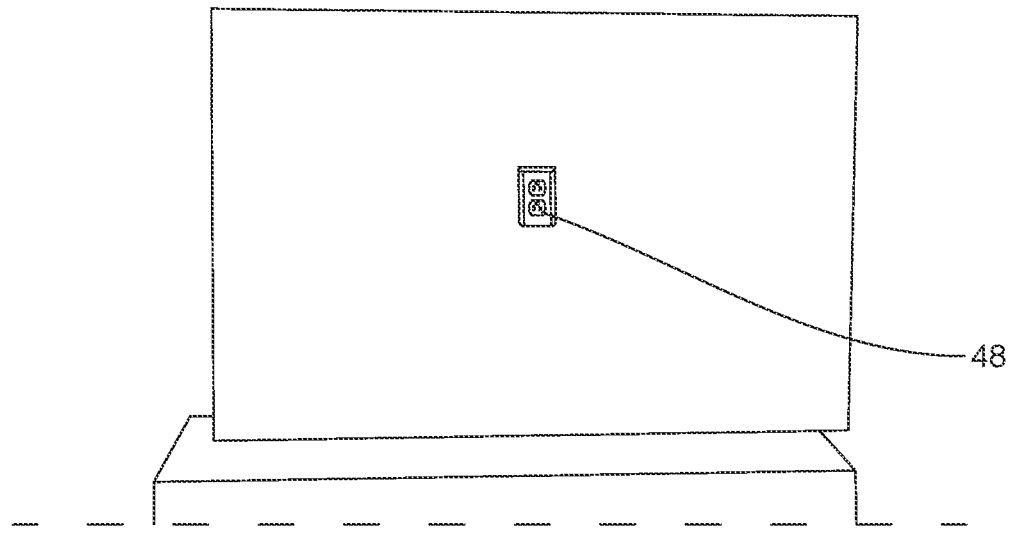
FIG. 16 is a front view of the wall of FIGS. 14 and 15 with an electrical socket installed.

As shown in FIG. 13, an appropriate sized tile ring 24 may be selected and installed on the front of the electrical box 12 of the stub-up 10. Solely for purposes of providing an example, a 1.25-inch tile ring may be selected and installed so that the tile ring 24 will be flush with the front surface of the wall, for instance, as shown in FIG. 14 after the carpenter sheaths the wall with wall panels 44. The tied off strings may then be used to pull electrical wires 46 through the stub-up 10 as shown in FIG. 15. Thereafter, an electrician may install an electrical outlet 48 or the like in the tile ring 22/electrical box 12. See FIG. 16.

Referring to the second example as shown in FIGS. 17-20, conduit turn ups are positioned within an area in which concrete is to be poured such that the bell ends of the conduits will be substantially flush with an upper surface of a concrete slab. The bell ends may have pull strings therein and may be covered with tape or the like. Thereafter, concrete may be poured to form the slab 54.

Figure 17:
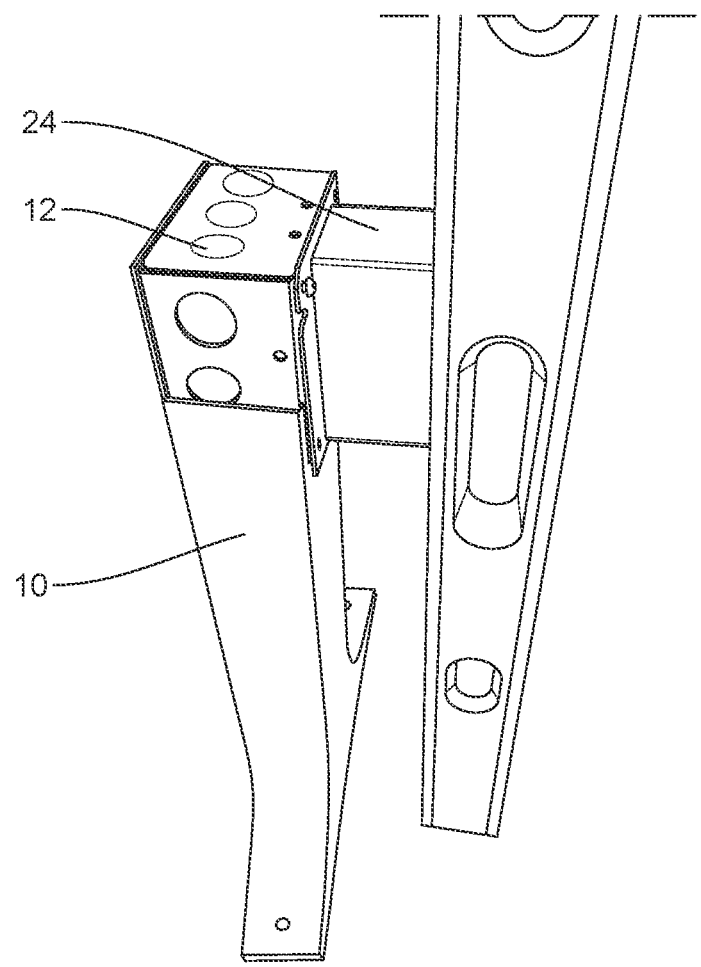
FIG. 17 shows a perspective view of a tile ring connected to the sub-up.

Wall lines may be snapped onto the slab 54 and a mason may lay out wall bond where concrete masonry units (CMUs) or the like are to by laid. Also, a desired center of the location of the electrical box 12 may be labeled on the slab 54. As shown in FIG. 17, the stub-up 10 may be positioned over the bell ends such that the center of the electrical box 12 may be positioned as desired. The string may be pulled through the stub-up 10 and tied off to the string ring 22 in the electrical box 12. The electrician may then plumb up the center of the electrical box as labeled and desired with the actual center of the electrical box 12 of the stub-up 10. As state above, the stub-up 10 may be designed to permit at least 5 inches of adjustment to the right or left relative to the location of the bell ends to permit desired positioning of the stub-up 10 and integral electrical box 12. Once the position is properly selected, masonry anchors may be used to anchor the stub-up 10 to the slab 54.

As shown in FIG. 17, a location of a front surface of a wall to be constructed is compared to the located of the electrical box 12 and an appropriate tile ring 24, such as a 2-inch tile ring, is selected and installed. Tile rings may be provided in a wide variety of sizes, for instance, in $\frac{1}{8}^{th}$ increments.

Figure 18:
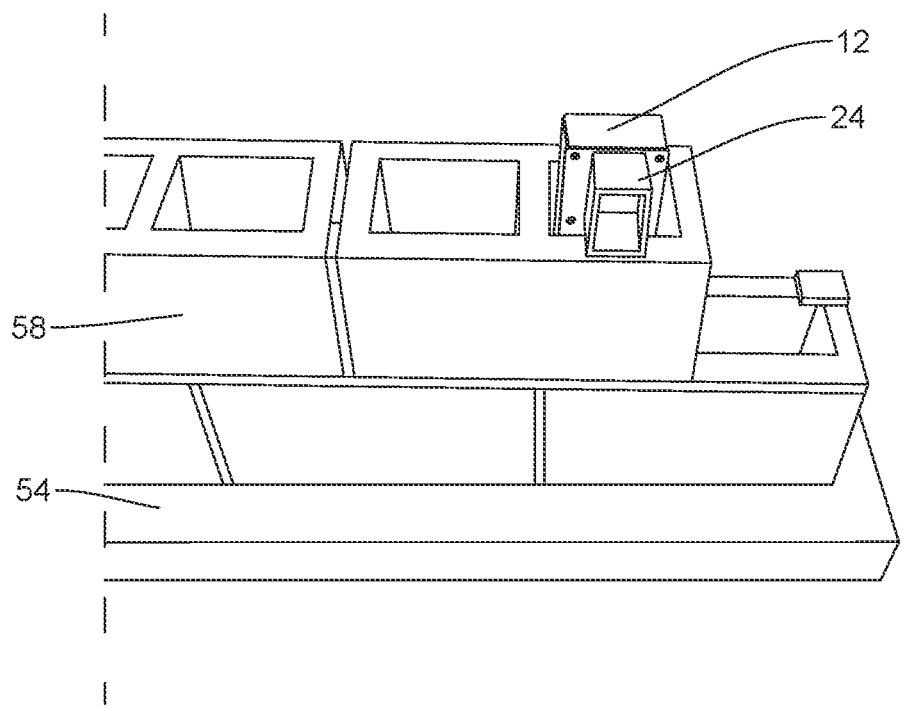
FIG. 18 is a view showing first and second courses of concrete masonry units (CMUs) of a masonry wall installed about the stub-up shown in FIG. 17.
Figure 19:
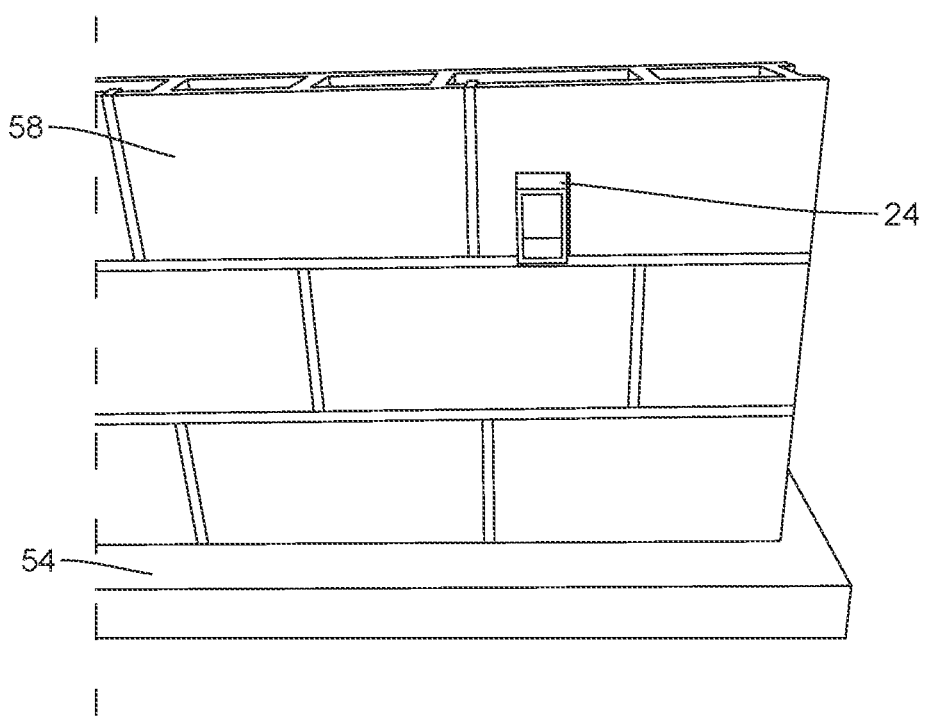
FIGS. 19 and 20 show the electrical box and electrical outlet as installed on the wall of FIG. 18.
Figure 20:
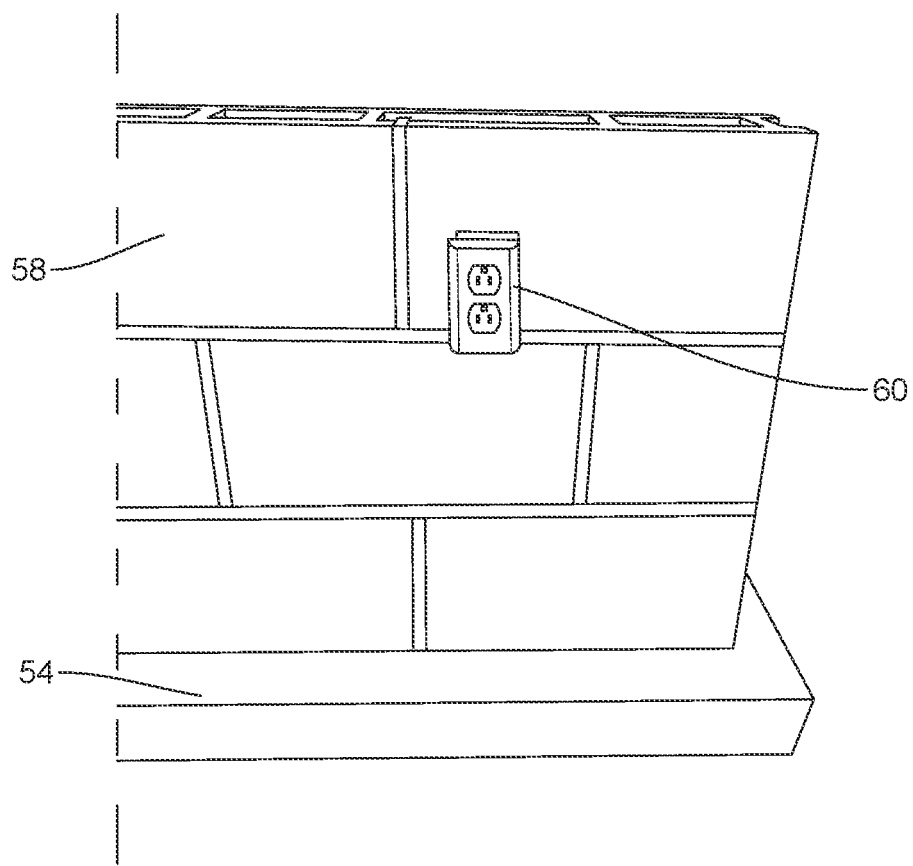

As shown in FIG. 18, the mason lays first and second courses of CMUs 58 or the like. Necessary cuts are made to the CMUs 58 such that they accommodate the stub-up 10 extending therein. A third course of CMUs 58 is shown in FIG. 19 and includes a cut-away second to expose the tile ring 24 and electrical box 12. This location, for instance, may be 18 inches to center AFF. The electrician may use the tied off strings to pull electrical wire through the stub up 10. The string may be, for instance, so-called mule tape/nylon flat rope. The electrician may then install an electrical outlet 60 within the tile ring 22/electrical box 12 as shown in FIG. 20.

By way of example, and not by way of limitation, the stub-up 10 may be made of metal, plastic or like material.

The foregoing description and specific embodiments are merely illustrative of the principles thereof, and various modifications and additions may be made to the stub-up by those skilled in the art, without departing from the spirit and scope of this invention.

I claim:

1. A building structure, comprising:
   a concrete slab floor in which an in-slab conduit is embedded for the passage of electrical wiring therethrough, the in-slab conduit has a bell end adjacent an upper surface of the concrete slab floor;
   a wall formed on the concrete slab floor such that the bell end of the in-slab conduit is located within the wall; and
   a stub-up anchored to the concrete slab floor within the wall over the bell end of the in-slab conduit, the stub-up comprising a hollow body having a front wall, a rear wall, an opposed pair of sidewalls, an upper end providing an integral electrical box, and a lower end providing a base anchored to the upper surface of the concrete slab floor such that the stub-up is in an upstanding position,
   wherein the front, rear, and opposed pair of sidewalls of the hollow body define an enclosed wireway extending within the hollow body for electrical wiring from the bell end of the in-slab conduit to the electrical box of the stub-up, and
   wherein spacing between the opposed pair of sidewalls increases along a length of the hollow body adjacent the lower end such that the wireway at the lower end is larger than the wireway at the upper end and the lower end of the hollow body is larger than the upper end of the hollow body thereby permitting a predetermined amount of lateral adjustment of the stub-up relative to the floor to position the electrical box at a desired location within a wall.

2. The building structure according to claim 1, wherein the wall is a studded wall or a masonry wall.

3. The building structure according to claim 1, wherein spacing between the front wall and rear wall of the hollow body remains constant from the lower end of the hollow body to the electrical box at the upper end of the hollow body.

4. The building structure according to claim 1, wherein the base of the hollow body includes a pair of oppositely extending lateral flanges extending from the opposed pair of sidewalls.

5. The building structure according to claim 4, wherein each of the lateral flanges includes a mounting hole through which an anchor may be extended to secure the stub-up to the underlying concrete slab floor.

6. The building structure according to claim 1, wherein the electrical box includes a string ring or hook extending within the electrical box to which string, used to pull electrical wiring through the stub-up, may be tied off.

7. The building structure according claim 1, further comprising a tile ring secured to the electrical box.

8. A method of installing a conduit stub-up, comprising the steps of:
   providing a one-piece hollow body having a front wall, a rear wall, an opposed pair of sidewalls, an upper end providing an electrical box, and a lower end providing a base such that the front, rear, and opposed pair of sidewalls of the hollow body define an enclosed wireway extending within the hollow body for electrical wiring from an underlying concrete slab to the electrical box;
   positioning the hollow body on a surface of a concrete slab over an exposed bell end of conduit embedded in the concrete slab for the passage of electrical wiring therethrough;
   anchoring the lower end of the hollow body to the concrete slab so as to position the electrical box at a desired location above the surface of the concrete slab; and
   constructing a studded wall or masonry wall such that the hollow body is located within the wall;
   wherein spacing between the opposed pair of sidewalls increases along a length of the hollow body adjacent the lower end such that the wireway at the lower end is larger than the wireway at the upper end and the lower end of the hollow body is larger than the upper end of the hollow body thereby permitting a predetermined amount of lateral adjustment of the stub-up relative to the floor during said positioning step.

9. The method according to claim 8, further comprising the step of adjusting the positioning of the hollow body over the exposed bell end of the in-slab conduit such that the upper end of the hollow body is laterally offset from the bell end and does not extend directly above the bell end.

10. The method according to claim 8, wherein the electrical box includes a string ring or hook extending within the electrical box to which string, used to pull electrical wiring through the stub-up, may be tied off, and further comprising the steps of extending string from the bell end of the in-slab conduit through the lower end of the hollow body to within the electrical box and tying the string to the string ring or hook within the electrical box.

11. The method according to claim 10, further comprising the steps of using the string to pull electrical wiring through the hollow box and installing an electrical outlet with the electrical box or a tile ring connected to the electrical box.

12. The method according claim 8, further comprising the step of connecting a tile ring to the electrical box.

\* \* \* \* \*